Dec. 5, 1939.  B. NIGHTENHELSER ET AL  2,182,772
CORN PICKING MACHINE
Filed March 11, 1939  2 Sheets-Sheet 1

Inventors:
BERT NIGHTENHELSER,
JULIUS BALLARD,
By Christian R. Nielsen
Attorney.

Inventors:
BERT NIGHTENHELSER and
JULIUS BALLARD,
By Christian R. Nielsen
Attorney.

Patented Dec. 5, 1939

2,182,772

UNITED STATES PATENT OFFICE 2,182,772

CORN PICKING MACHINE

Bert Nightenhelser, Westfield, and Julius Ballard, Noblesville, Ind.

Application March 11, 1939, Serial No. 261,276

6 Claims. (Cl. 56—18)

This invention relates to a corn picker readily applicable to tractors and it consists in the construction, arrangements and combination of parts herein described and claimed.

It is an object of the invention to provide an implement of this class which is particularly adapted to be used to pick and husk corn and also for gathering loose corn which may be lying on the ground, and to accomplish this end provision is made of sweeps which travel close to the ground.

It is a still further object of the invention to provide a structure embodying the sweeps, snapping rolls and conveyors in a frame, as a unit, and applicable to a tractor, and in which the frame is readily adjusted vertically with respect to the standing corn stalks.

It is a still further object of the invention to provide a novel construction of sweep, embodying flexible corn-engaging members, thereby insuring gathering of all loose corn which may be on the ground, in the path of the sweeps.

Additional objects, advantages and features of invention will be apparent from the following description considered in conjunction with the accompanying drawings, wherein Figure 1 is a side elevation of a tractor, partly in section showing the implement applied.

Figure 4 is a cross section through the snapping rolls.

Figure 5 is an enlarged detail of the lower mounting of the snapping rolls.

Figure 1:
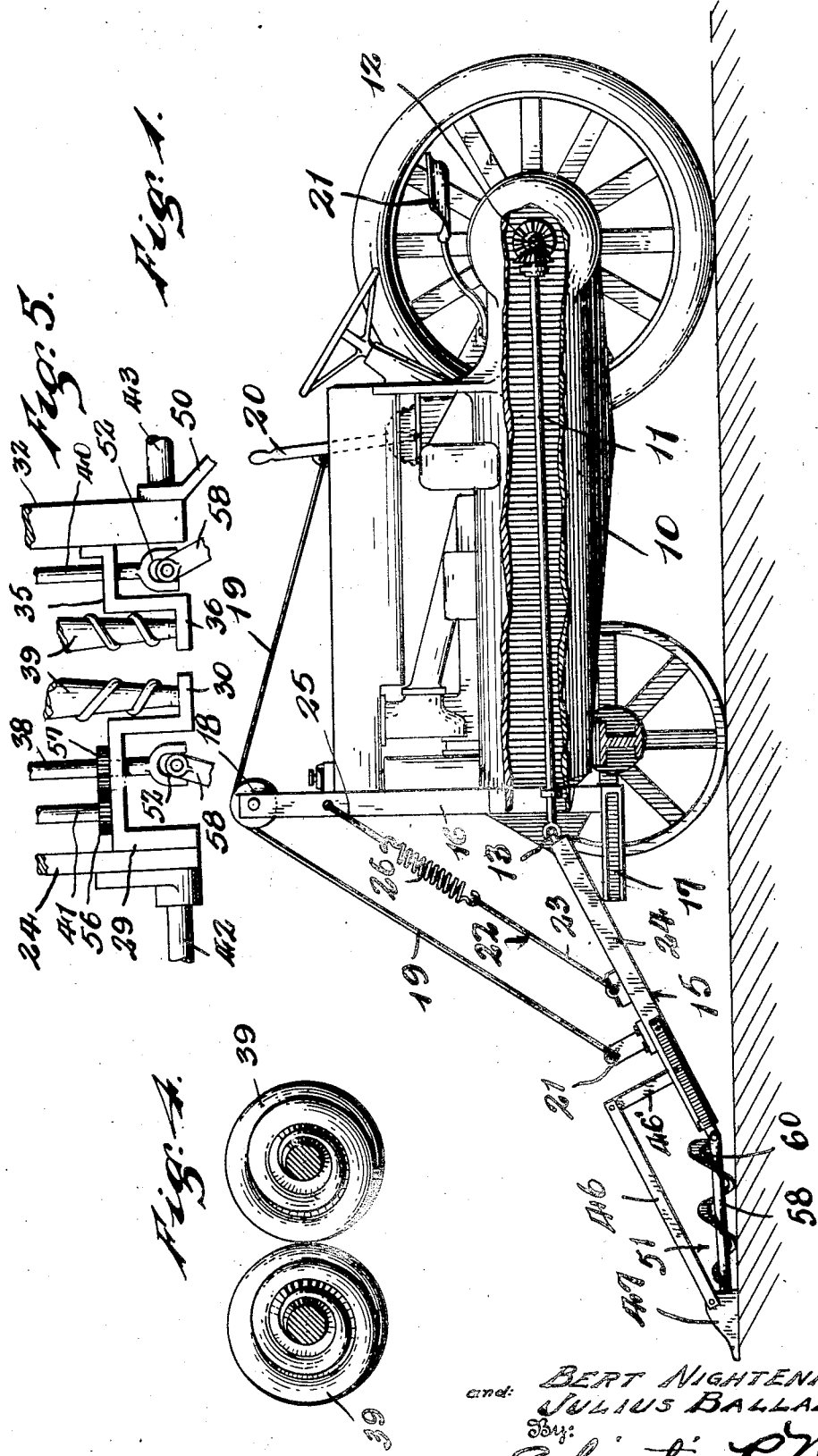

There is illustrated a tractor 10 which may be of any well known construction, upon both sides of which there is extended forwardly respective shafts 11. The shafts 11 are suitably journalled and driven by power take off and associated with two unit rear drive of the tractor. The shafts 11 project from the forward end of the tractor and are provided with a member of a universal joint 13 complemental to a ball or socket, as the case may be, on a shaft 14 of the picker unit 15.

An upright framing 16 is mounted upon the forward end of the tractor and includes a right angular base member 17 affording support of the picker unit. A guide roller 18 is revolubly mounted upon the upper end of the frame 16 functioning to guide a draw cable 19, one end of which is secured to a hand lever 20, located in a position convenient to be manipulated from the driver's seat 21, the other end being secured to an upstanding lug 21 of the unit 15. Obviously, the unit 15 may be raised and lowered through manipulation of the lever 20.

In order that the unit 15 may be resiliently supported and to assist support of the unit, we provide a support means generally indicated at 22, which consists of a tie rod 23 anchored to the frame 24 of the unit and tie rod 25 fixed to the upright 16. The free ends of the rods 23—25 are anchored to respective ends of a helical spring 26. Thus, it will be seen that the unit 15 will be supported, yet, by provision of the universal joint 13—14, the unit 15 may partake of vertical movements which may be necessary due to inequalities of the ground surface. When the unit must rise over a portion of ground, it will be apparent that the spring 26 will reduce or lessen the shock of return to normal position of the unit. It will also be apparent that manipulation of the lever 20 will function to elevate or raise the entire unit 15 from the ground level such as is required when it is desired to move the tractor for a considerable distance, as from one field of operation to another.

Figure 2:
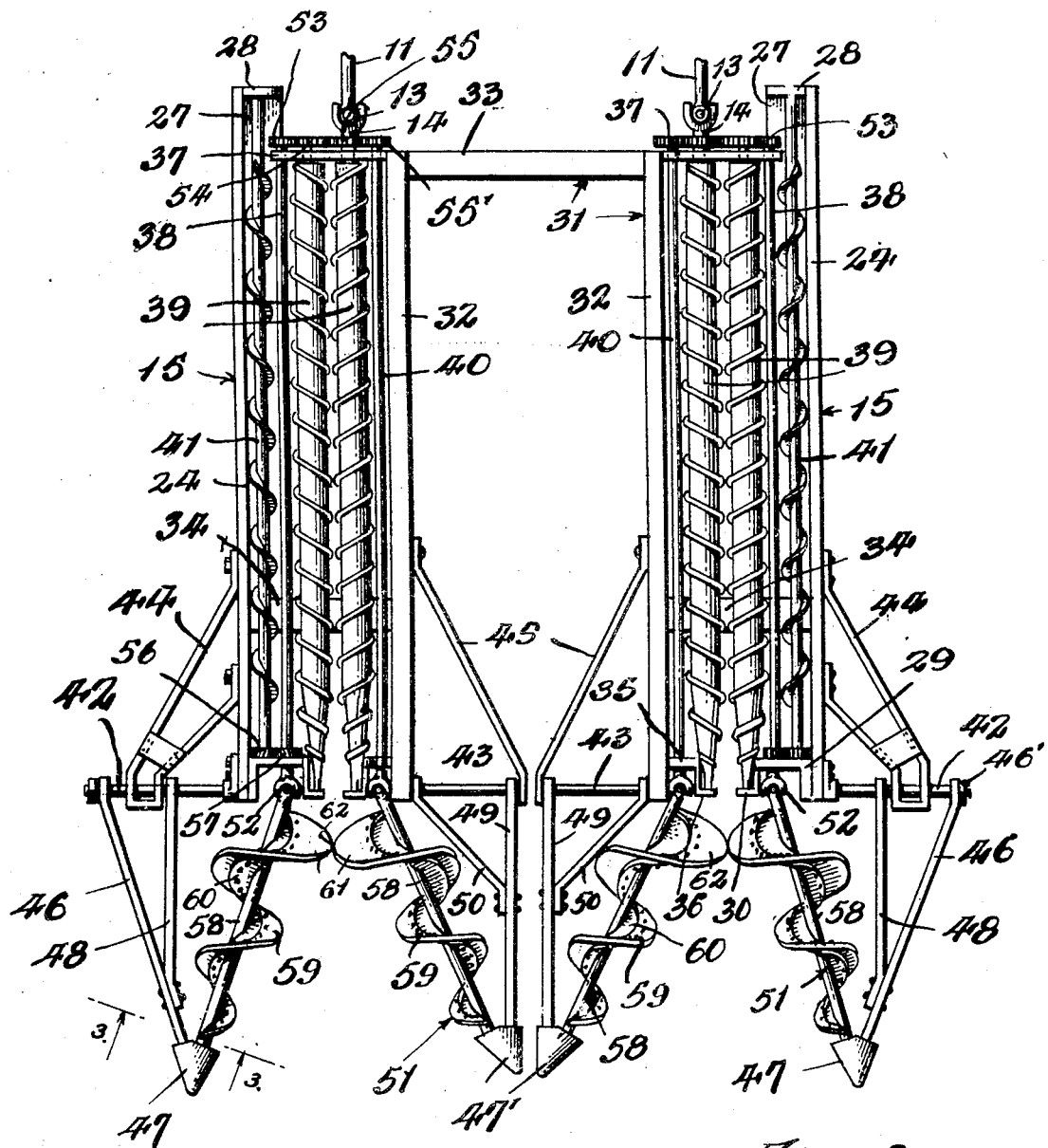
Figure 2 is a top plan view of the implement, detached from the tractor.
Figure 3:
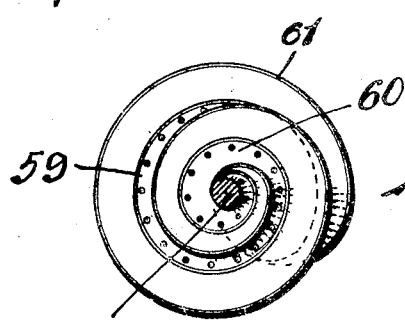
Figure 3 is a cross section on the line 3—3 of Figure 2.

Attention is now invited to Figure 2 of the drawings for an understanding of the unit structure 15. The unit 15 consists of longitudinal frame members 24 having a right angular base member 27, the rear ends of which are connected by a plate 28. The forward ends of the frame 24 and base member 27 are connected by a channel member 29, one end of the channel member having a right angular extension 30 suitably journalled for a purpose to be described hereinafter.

A medial frame 31 is provided consisting of longitudinal stringers 32 parallel to the frame members 24, but spaced therefrom connected at their rear ends by a cross beam 33. At the forward ends of the frame 24 and the stringers 32 brace or stay members 34 are connected thereacross, affording rigidity to the structure.

A bracket 35 is fixed to the stringers 32 at the forward ends thereof, each including a right angular member 36 suitably journalled and aligned with the extension 30.

A frame piece 37 is connected between the base member 27 and stringers 32 adjacent the rear ends thereof, the frame 37 being journalled for revolubly mounting one end of a drive shaft 38, a pair of snapping rolls 39 and a second drive shaft 40. The drive shafts 38 have their other ends journalled in the brackets 29 and the other ends of the snapping rolls are journalled in the extensions 30 and 36 of respective brackets 29 and 35. The second drive shafts 40 are journalled in respective brackets 35 as clearly shown in Figure 5.

An elevating auger 41 is journalled between the plates 28 and brackets 29 and function to elevate corn received from the snapping rolls.

From the side frame members 24, at their forward ends there are secured oppositely extended shafts 42 and from the stringers 32 similar shafts 43 are fixed all of which is clearly illustrated in Figure 2. A brace 44 engages the shafts 42, being fixed to the side frames 24 for support of the shafts, and similarly the shafts 43 are supported by a brace member 45, one end of which is secured to respective stringers 32.

Upon the shafts 42 there is swingably mounted a lever 46, the forward end of which carries a shoe 47, and if desired, a brace lever 48 may be incorporated between the shafts 42 and the levers 46 to afford greater rigidity. As may be seen in Figure 1, the lever 46 is pivotally connected to an upstanding lug 46' of the unit 15 and similarly connected to the shoe 47. The shoes 47' are similarly mounted, and while we have shown a single cable 19 for actuating the units 15 it should be understood that each of the units will be simultaneously raised or lowered upon manipulation of the hand lever 20.

The shafts 43 also carry a lever 49 for support of respective shoes 47' and angle braces 50 may be connected between respective shafts 43 and levers 49.

Each of the shoes 47—47' revolubly support the lower end of a sweep generally indicated at 51, the upper ends of the sweeps being connected to respective shafts 38 or 40 as the case may be, by a universal joint 52.

The drive for the shafts 38 and 40, snapping rolls 39, elevating augers 41 and the sweeps 51 will now be explained, and since the drive for either side of the unit 15 is identical, the description of one will be sufficient for an understanding of the operation.

The rear end of the drive shaft 38 has a gear 53 in mesh with a gear 54 on the shaft of the next adjacent snapping roll 39, which in turn is in mesh with a gear 55 on the shaft of a complemental snapping roll, the latter shaft being driven direct from the drive shaft 11 from the power take-off of the tractor. The gear 55, in turn is in mesh with a gear 55' fixed to the shaft 40.

The elevating auger 41 has a gear 56 fixed to the shaft thereof in mesh with a gear 57 keyed to the shaft 38, and it will therefore be apparent that through rotation of the drive shafts 11 motion will be imparted to the auger, snapping rolls and the sweeps.

The sweeps 51 are arranged in pairs, as clearly shown in Figure 2, the augers being arranged in divergent relation to one another, in each pair, as will now be described.

The sweeps 51 each comprise a shaft 58, upon which there is a helical worm 59, the helicoidal pallets 60 of which increase in diameter from the shoes 47—47' toward the rear of the shafts 58. However, the pallets 60 are of such diameter that the largest rearmost pallets lie spaced from one another for a purpose to be explained.

Upon each of the worms 59 a canvas facing 61 is secured and as may be seen in Figure 5, the facing 61 is secured inwardly of the periphery of the pallets of the worm and extends circumferentially therearound increasing in diameter in proportion to the increase in diameter of the pallets 60, until the last pallet is reached where the canvas facings actually contact in an edge to edge relation, as indicated at 62.

While we have specified a canvas facing, this is not essential for any suitable flexible material may be employed, so long as it has the necessary wearing quality, for in operation, the facings are intended to sweep the ground in order to gather any corn which may be lying upon the ground in advance of paired sweeps; and obviously, where the facings actually contact one another, the corn on the sweeps will be positively delivered to the snapping rolls and finally to the elevating augers of the units, from whence the corn will be treated as is customary.

While we have shown and described a certain preferred embodiment of the invention, this is by way of illustration only, and we consider as our own all such modifications in structure as fairly fall within the scope of the appended claims.

We claim:

1. In a corn harvesting machine, the combination with a tractor having forwardly extended power take-off shafts, a snapping roll unit connected with each shaft, each unit including an auger operatively connected with the snapping roll unit for elevating corn received therefrom, a pair of divergently arranged sweep members for each snapping unit, each sweep member comprising a shaft, a drive shaft between each sweep member and operatively connected with the respective snapping roll units, means for longitudinally adjusting the snapping roll units with respect to the sweep units, said sweep shafts having a tapering helicoidal worm increasing in diameter in direction of the snapping rolls to a point of actual contact between the worms of each unit immediately in advance of the snapping rolls.

2. The structure of claim 1 in which the helicoidal worm comprises a flexible ground-engaging surface.

3. A sweep unit for corn harvesters and the like comprising a frame hingedly connected to a snapping roll unit, said sweep unit comprising a pair of driven helicoidal worm members diverging to the snapping roll unit, and draft means for raising and lowering the snapping roll unit with respect to the sweep unit.

4. A sweep unit for corn harvesters and the like comprising a frame hingedly connected to a snapping roll unit, said sweep unit comprising a pair of driven helicoidal worm members diverging to the snapping roll unit, draft means for raising and lowering the snapping roll unit with respect to the sweep unit, said helicoidal worm members each having a flexible circumscribing ground-engaging surface, said worm members being tapered and increasing in diameter in the direction of the snapping rolls to a point of actual peripheral contact between respective ground-engaging surfaces immediately in advance of the snapping rolls.

5. The structure of claim 4 in which the helicoidal worm is formed integrally with a shaft thereof and upon which there is secured a flexible ground-engaging member, said member extending peripherally of the worm to a point of actual peripheral contact between respective ground-engaging members immediately in advance of the snapping rolls.

6. A sweep unit for corn harvesters and the like comprising a frame having a pair of helicoidal worm members diverging toward one end of the frame, and a flexible ground-engaging member on the periphery of each worm.

BERT NIGHTENHELSER.
JULIUS BALLARD.